United States Patent [19]

Yokoyama et al.

[11] Patent Number: 4,964,483
[45] Date of Patent: Oct. 23, 1990

[54] MOTOR SCOOTER

[75] Inventors: Masashi Yokoyama, Tokyo; Naoki Hara, Saitama, both of Japan

[73] Assignee: Honda Giken Kogyo Kabushiki Kaisha, Tokyo, Japan

[21] Appl. No.: 247,519

[22] Filed: Sep. 22, 1988

[30] Foreign Application Priority Data

Sep. 25, 1987 [JP] Japan .................. 62-241897
Jan. 11, 1988 [JP] Japan .................. 63-1169[U]

[51] Int. Cl.⁵ .............................................. B60P 3/22
[52] U.S. Cl. .................... 180/219; 280/833; 180/69.4; 180/225
[58] Field of Search .............. 180/219, 69.4, 225; 280/830, 831, 833, 834, 835

[56] References Cited

FOREIGN PATENT DOCUMENTS 60-154969 8/1985 Japan .
62-103793 7/1987 Japan .
2049582 12/1980 United Kingdom .

Primary Examiner—Charles A. Marmor
Assistant Examiner—Richard Camby
Attorney, Agent, or Firm—Lyon & Lyon

[57] ABSTRACT

A motor scooter having a seat mount and a foot rest floor contains a fuel tank of limited height but expensive horizontal dimensions positioned beneath and in close proximity to the foot rest floor in order to advantageously lower the effective center of gravity of the vehicle and to enable the use of a fuel tank having increased capacity.

13 Claims, 10 Drawing Sheets

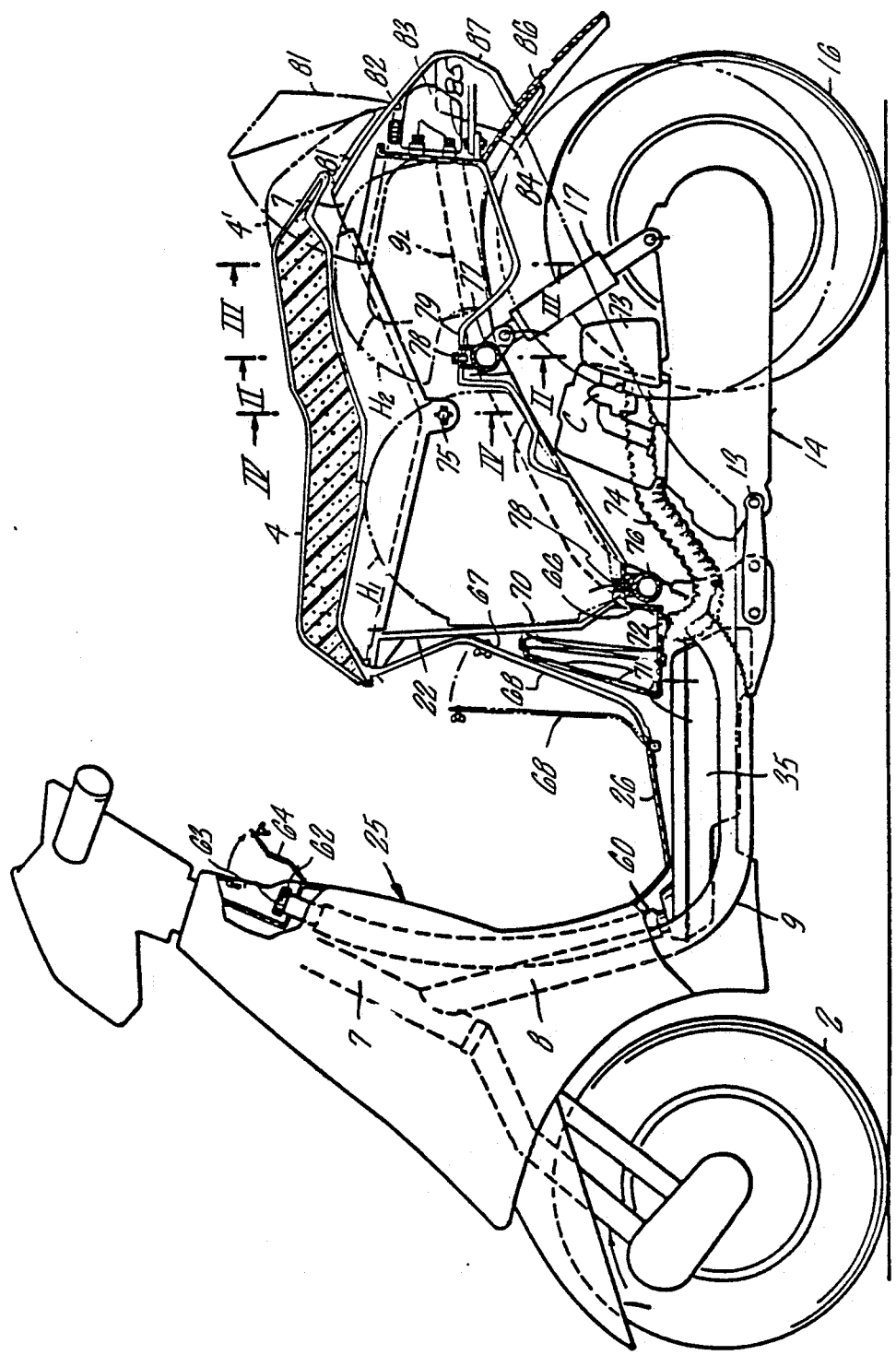

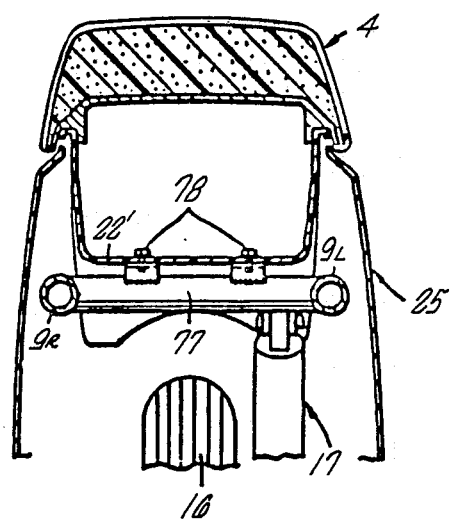
FIG_14_
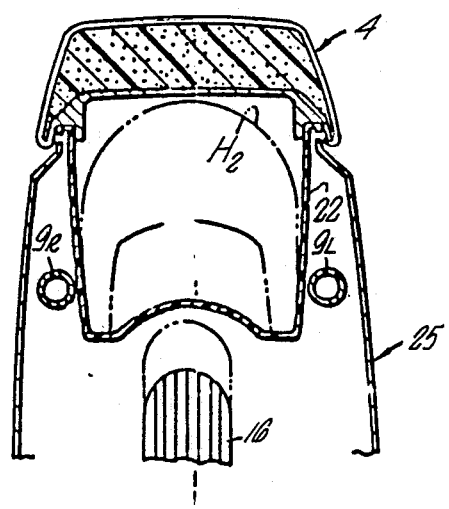
FIG_15_
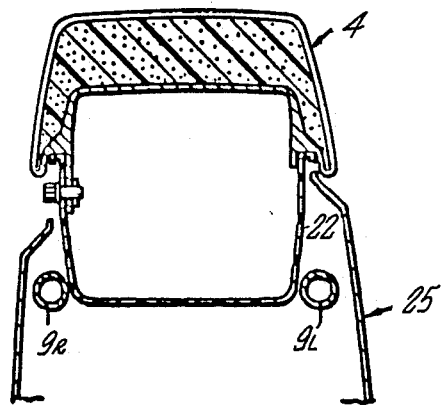
FIG_16_

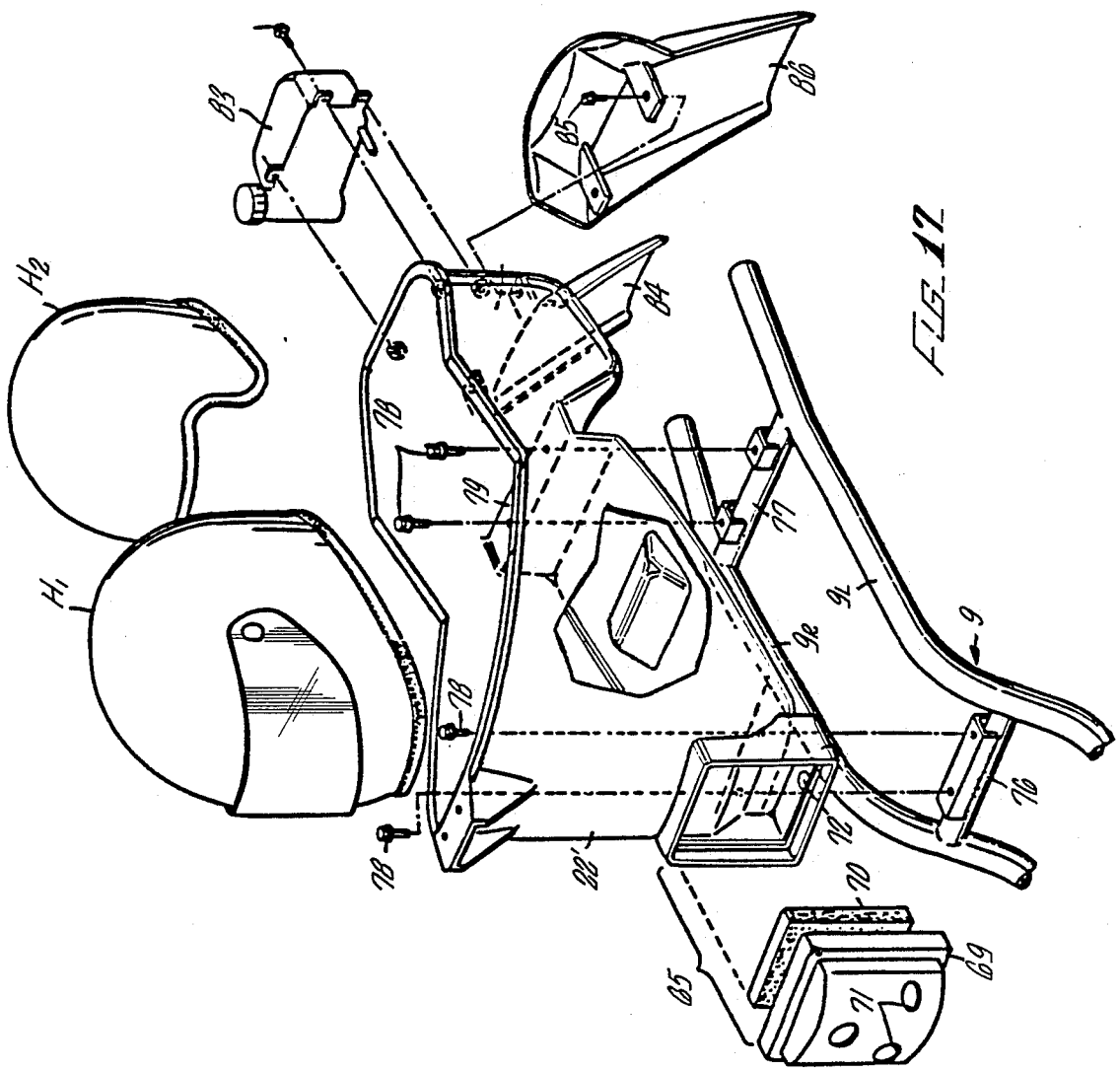

MOTOR SCOOTER

BACKGROUND OF THE INVENTION

The present invention relates to motor scooters and, more particularly, to motor scooters of the two-wheel or three-wheel type having a foot rest in front of and below the seat and a fuel tank assembly for installation therein.

A motor scooter provided with a fuel tank having a portion disposed under the foot rest floor in front of the seat is disclosed in Japanese Patent Laid-Open No. 60-154969.

Fuel tanks for motor scooters contain fuel and are a comparatively large and heavy component as compared with the other accessories of the motor scooter. Therefore, the fuel tank must meet the following conditions in mounting the same on the motor scooter:

(1) it must not degrade the running performance of the motor scooter;
(2) it must be protected from damage;
(3) it must not interfere with the other functional parts of the vehicle;
(4) it must have an adequate capacity; and
(5) it must not detract from the space utilizable as a luggage compartment nor the external appearance of the motor scooter.

It is accordingly desirable that the fuel tanks employed in motor scooters be of a simple construction and capable of meeting the foregoing requisite conditions.

In this known motor scooter, the fuel pump must be disposed remote from the engine of the power unit, which is located in the rear portion of the motor scooter, a comparatively long fuel supply pipe is necessary for connecting the fuel pump to the engine. Still further, the components of the fuel supply system, such as the fuel pump, must be provided under the foot rest floor under limited conditions of arrangement, which makes compact construction of the fuel supply system difficult.

The present device has accordingly been invented to ameliorate the aforementioned disadvantages of the prior art.

SUMMARY OF THE INVENTION

To achieve the foregoing object, the present invention provides a motor scooter having a frame, front and rear wheels suspended on the frame, a body cover covering the frame and having a seat mount, a foot rest positioned in front of the seat mount, a fuel tank assembly disposed below the foot rest and a luggage compartment positioned below a seat on the seat mount and adjacent to the rear portion of the fuel tank at the front lower portion of the seat mount.

The horizontal flat fuel tank can be disposed within a dead space under the foot rest floor of the body panel, and the fuel tank is protected from damage by the right and left frame pipes of the motor scooter frame structure. Furthermore, since the fuel filling mouth is formed in the rear portion of the fuel tank, a flat wide area is available for the foot rest floor. Still further, the upper wall of the fuel tank inclining toward the front suppresses the disturbance of the surface of the fuel contained in the fuel tank by the vibrations of the motor scooter.

In the motor scooter of the invention a center cover rises from the rear end of the foot rest floor to the front end of the bottom of the seat so that the fuel filling mouth is located within the space behind the center cover. A fuel strainer and a fuel pump are disposed beside the fuel filling mouth.

According to the present device, the fuel filling mouth does not project from the upper surface of the foot rest floor and, hence, an increased area is available for resting the feet. The driver is, thereby, allowed to drive the motor scooter in a comfortable position. The arrangement of the fuel filling mouth, the fuel strainer and the fuel tank side-by-side widthwise of the motor scooter within a space behind the center cover enables a compact arrangement of the components of the fuel supply system within the same space. Furthermore, the disposition of the fuel filling mouth, the fuel strainer and the fuel pump on a level above the foot rest floor enables the provision of a fuel tank having an increased capacity under the foot rest floor. Still further, since the fuel pump is disposed near the engine, the fuel pump can be connected to the engine by a fuel supply pipe having a reduced length.

Moreover, according to the present invention, a heat insulating member can be provided between the fuel pump and the engine to insulate the fuel pump from the heat generated by the engine, which enables the further reduction of the length of the fuel supply pipe interconnecting the fuel pump and the engine.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 13 is a view similar to FIG. 1 illustrating another embodiment of the present invention;

FIG. 14 is a sectional view taken along line II—II of FIG. 13;

FIG. 15 is a sectional view taken along line III—III of FIG. 13;

FIG. 16 is a sectional view taken along line IV—IV of FIG. 13; and

FIG. 17 is an exploded partial perspective view of the motor scooter embodiment of FIG. 13.

DESCRIPTION OF THE PREFERRED EMBODIMENTS

Figure 1:
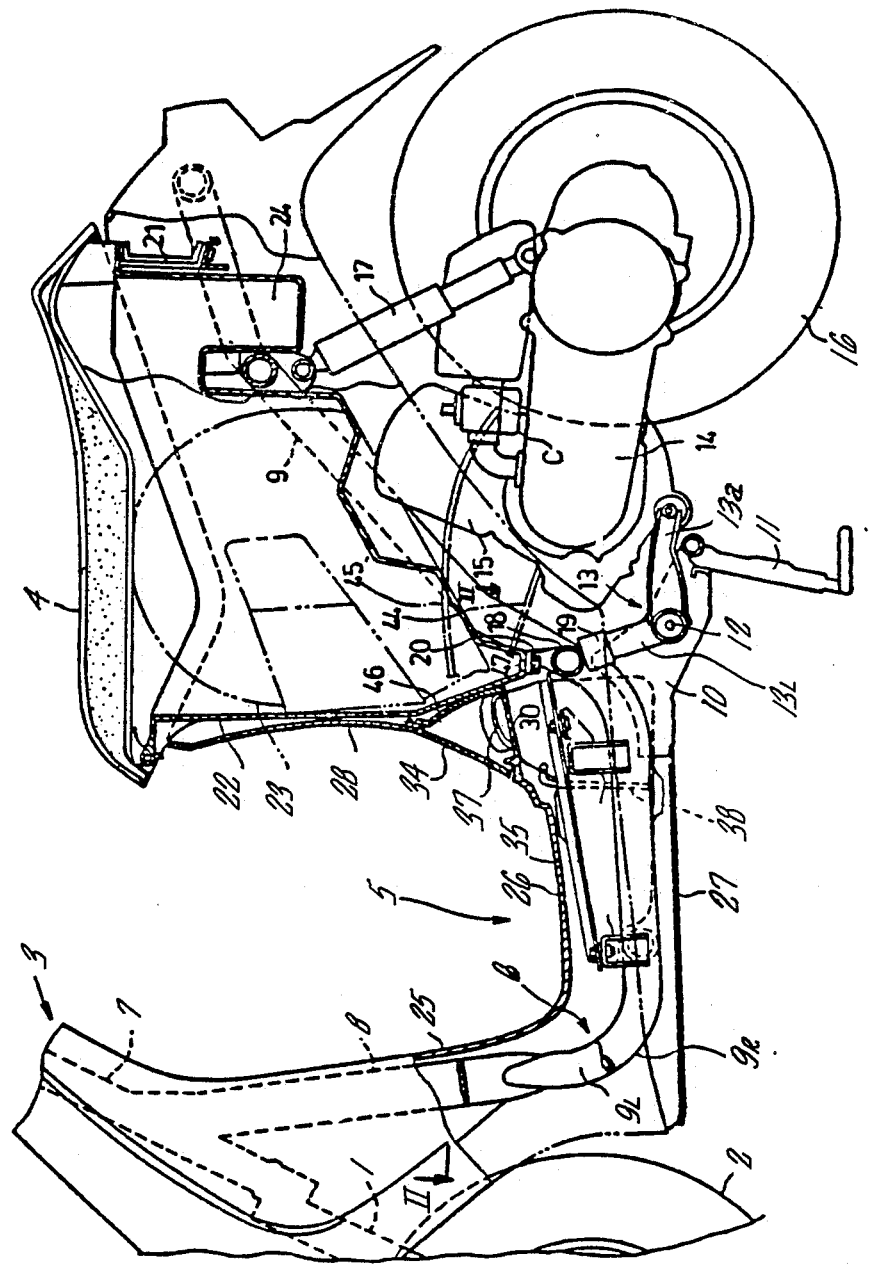
FIG. 1 is a partial side elevation, partly in section, of a motor scooter employing a fuel supply system according to the present invention.
Figure 7:
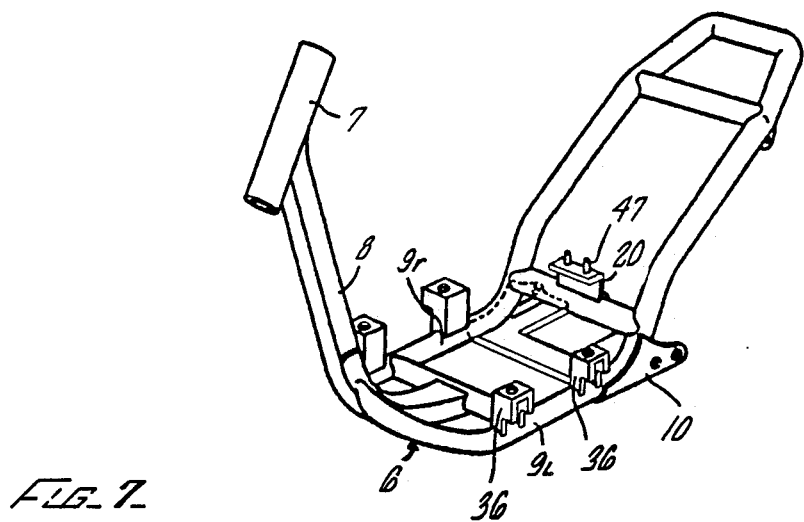
FIG. 7 is a perspective view of the main frame of the chassis of the motor scooter of FIG. 1.

FIG. 1 is a longitudinal sectional side elevation showing an essential portion of a motor scooter incorporating a fuel supply system according to a first preferred embodiment of the present device. A steering head 3 is formed in the front portion of the motor scooter. A front wheel 2 is suspended on the steering head 3 below the same by a front fork 1, and a handle (not shown) is provided on the upper end of the steering head 3. A floor section 5 is formed in the lower portion of the body between the steering head 3 and a seat 4 is provided in the rear portion of the body. The steering head section and the seat section are interconnected by a substantially U-shaped main frame 6. As shown in FIG. 7, the main frame 6 is composed of a head pipe 7, a down pipe 8 having an upper end fixed to the head pipe 7 and extending obliquely downwardly, a pair of frame pipes 9 (a right frame pipe 9r and a left frame pipe 9l) branched from the lower end of the down pipe 8 respectively to the right and left and having each a horizontal portion extending toward the rear along the floor section 5, a rising portion rising from the rear end of the horizontal portion upwardly and a rear portion extending toward the rear from the upper end of the rising portion, and cross members extending between and interconnecting the pair of frame pipes 9r and 9l.

A bracket 10 is welded to the frame 6 at the junction of the horizontal portion and the rising portion of the frame pipe 9 so as to extend rearwardly. A retractable stand 11 is joined pivotally to the extremity of the bracket 10 by a pivot shaft 12, and a lever 13 is joined pivotally to the middle portion of the bracket 10. The lever 13 has an arm 13a extending toward the rear. The arm 13a is joined pivotally at the rear end thereof to a power unit 14. An engine 15 is mounted integrally on the power unit 14 in the front portion of the same, and a rear wheel 16 is supported rotatably on the power unit 14 in the rear end of the same. A shock absorber 17 is extended between the rear end of the power unit 14 and the frame pipe 9. The other arm 13b of the lever 13 has a cylindrical shape. The upper end of the arm 13b is fitted in a cylindrical rubber stopper 19 attached to a cross pipe 18 interconnecting the frame pipes 9r and 9l. The vertical movement of the power unit 14 is controlled elastically by the stopper 19.

A helmet container 22 is disposed above the power unit 14 and is fixed to brackets 20 and 21 attached to the frame pipe 9. The seat 4 is mounted on and fastened to the helmet container 22.

A helmet 23 is contained in the helmet container 22, and a kit box 24 is formed in the rear section thereof.

Figure 8:
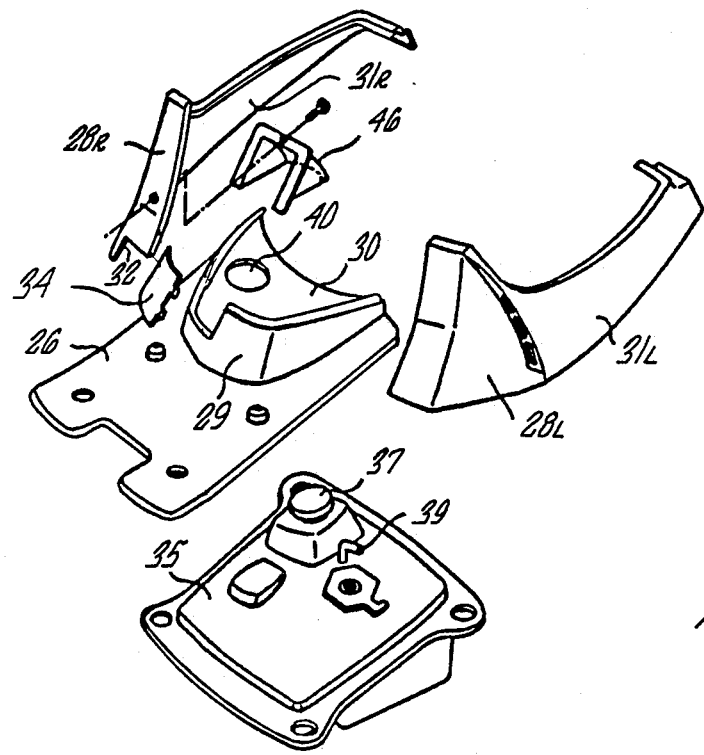
FIG. 8 is an exploded perspective view illustrating the fuel tank and adjacent cover members.

The chassis principally formed by the main frame 6, is covered with a body cover 25. The body cover 25 has a foot rest floor 26 extending over and covering the frame pipes 9 in the floor section 5, an under cover member 27 extending under and covering the lower and side surfaces of the frame pipes 9, and a center cover 28 rising from the rear end of the foot rest floor 26 to the front end of the bottom of the seat 4. As shown in FIG. 8, the foot rest floor 26 having the shape of a flat plate, extends between the front and rear ends of the floor section 5 and has an arcuately formed rising wall 29 in the rear portion thereof. A crescent-shaped partition wall 30 extends toward the rear from the rear surface of the rising wall 29 in a plane above the plate-shaped front portion of the foot rest floor 26.

Figure 2:
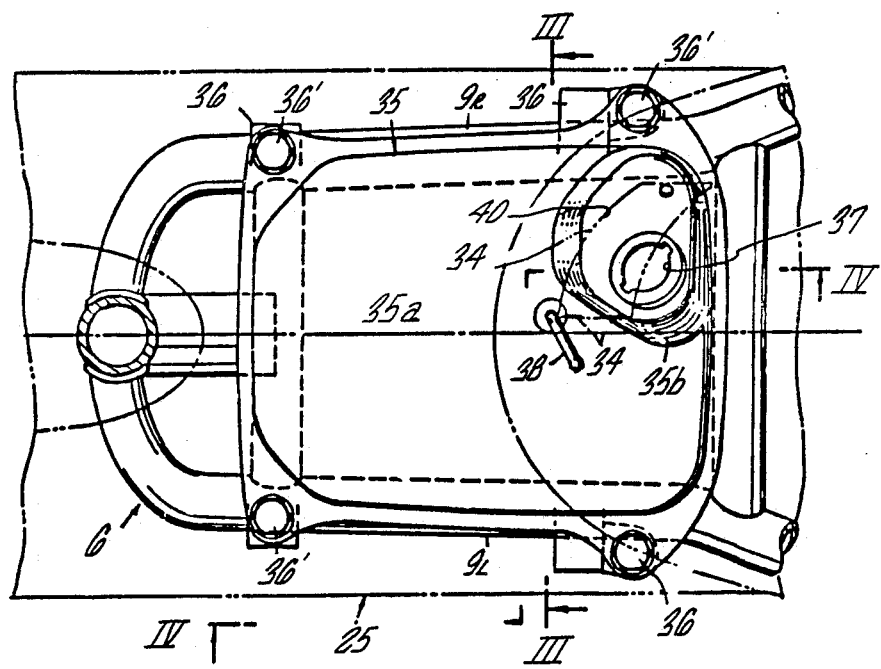
FIG. 2 is a sectional view taken along line II—II of FIG. 1.
Figure 3:
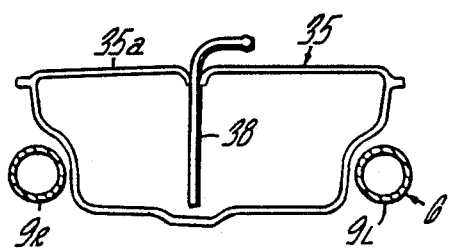
FIG. 3 is a fragmentary longitudinal sectional view taken along line III—III of FIG. 2.
Figure 4:
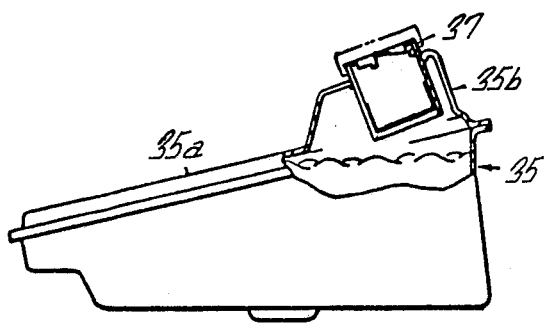
FIG. 4 is a fragmentary longitudinal sectional view taken along line IV—IV of FIG. 2.

The upper edge of the rising wall 29 is joined to the lower edge of the center cover 28. As shown in FIG. 8, the center cover 28 is divided into two parts, namely, a right center cover member 28r and a left center cover member 28l, along the center line of the chassis. Side covers 31r and 31l, respectively, for covering the opposite sides of the chassis under the seat 4 are formed integrally with the right and left center cover members 28r and 28l, respectively. A recess 32 is formed in the lower portion of the right center cover member 28r, and a recess 33 is formed in the right-hand side of the rising wall 29 so as to correspond to the recess 32. When the center cover 28 is joined to the rising wall 29, a rectangular window is formed by the recesses 32 and 33 in the right-hand lower portion of the center cover 28. The window is covered with lid 34 connected by hinges 34' as shown in FIG. 2.

A fuel tank 35 is disposed within a space enclosed by the foot rest floor 26 and the under cover 27 between the frame pipes 9r and 9l, and is fastened to brackets 36 fixed to the fame pipes 9r and 9l via bolts 36'. The upper surface 35a of the tank 35 is provided in its rear portion with a bulge 35b. The bulge 35b is closed in a dead space formed between the container 22 and the rising wall 29. As best shown in FIG. 8, a fuel filling mouth 37 is formed in the bulge 35b on the upper wall of the fuel tank 35. A fuel outlet pipe 39 is inserted through the upper wall of the fuel tank 35 in the fuel tank 35 at a position on the left side of the fuel filling mouth 37. The fuel filling mouth 37 projects upward toward an opening 40 formed in the partition wall 30 and opens opposite the window formed of the recesses 32 and 33. Accordingly, fuel can be filled in the fuel tank 35 through the fuel filling mouth 37 after opening the lid 34.

Figure 9:
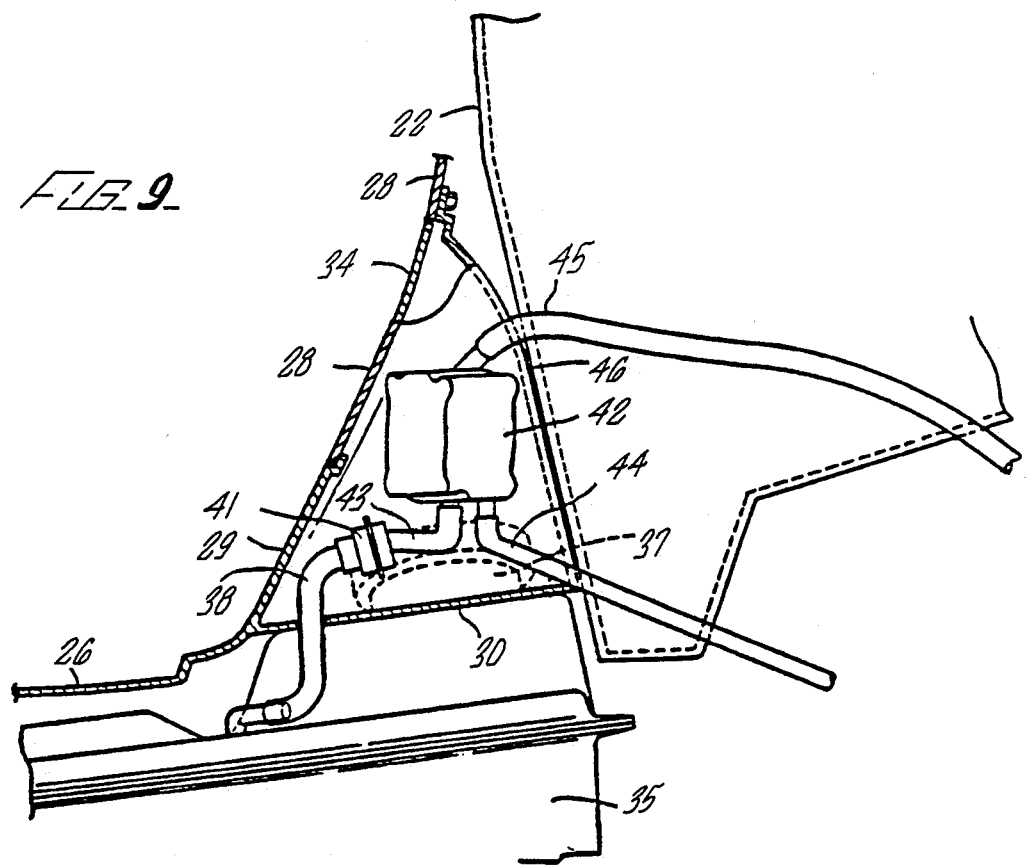
FIG. 9 is an enlarged side elevational view, party in section, illustrating the fuel pump and associated components.
Figure 10:
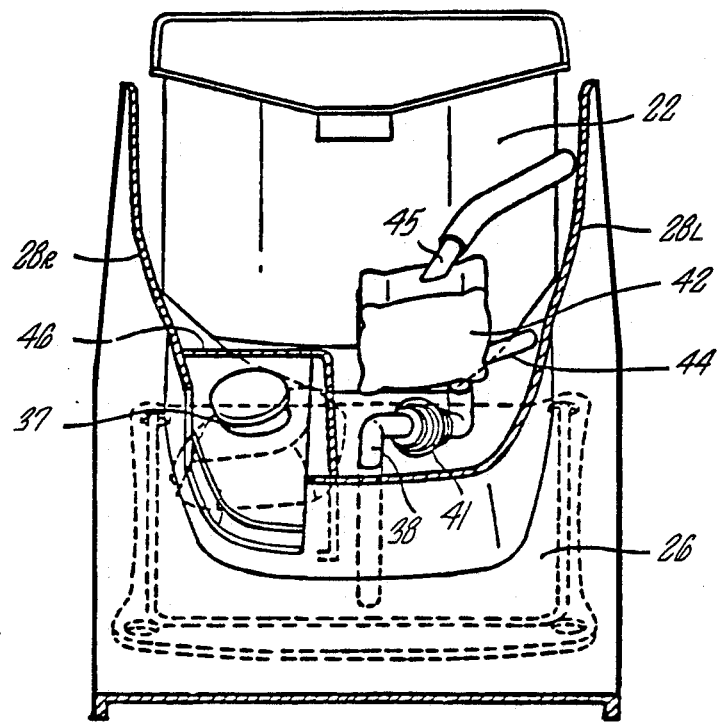
FIG. 10 is a front view of a portion of FIG. 9.

As shown in FIGS. 9 and 10, a fuel strainer 41 and a fuel pump 42 are disposed above the partition wall 30 on the left side of the fuel filling mouth 37 and are fastened to a bracket fixed to the main frame. A fuel supply pipe 38 connected at one end thereof to the fuel outlet pipe 39 is extended upwardly through the partition wall 30 and is connected to the inlet of the strainer 41. The outlet of the strainer 41 is connected to the suction port of the fuel pump 42 by a suction pipe 43. The fuel pump 42 is of a negative pressure type operated by the negative pressure generated by the engine 15. Indicated at 44 is a negative-pressure pipe for applying a negative pressure generated by the engine 15 to the fuel pump 42. The fuel discharged by the fuel pump 42 is fed through a fuel feed pipe 45 to a carburetor C, which in turn feeds the fuel to the engine 15 (FIG. 1). A partition wall member 46 is provided behind the fuel filling mouth 37, the strainer 41 and the fuel pump 42 arranged over the partition wall 30. The front wall of the helmet container 22 extends behind and along the partition wall member 46. The lower portion of the helmet container 2 extends below the partition wall member 46 and is fastened to the bracket 20 with a bolt 47.

In this embodiment thus constructed, since the fuel tank 35 is formed of a flat shape so as to be disposed in a horizontal position under the foot rest floor 26 of the body panel 25, the dead space under the body panel 25 can be utilized for accommodating a fuel tank 35 having a comparatively large capacity. Furthermore, since the fuel tank 35 is disposed between the right and left frame pipes 9 of the frame 6, the fuel tank 35 can be guarded from obstacles. The fuel filling mouth 37 of the fuel tank 35 disposed under the foot rest floor 26 projects into the space behind the center cover 38 and does not project above the foot rest floor 26, and hence the foot rest floor 26 has a wide flat upper surface. Since the fuel filling mouth 37, the strainer 41 and the fuel pump 42 are disposed in a compact arrangement within the space enclosed by the partition wall 30, the center cover 28 and the partition wall member 46 in an upper position behind the foot rest floor 26 and near the engine 15 of the power unit 14, the fuel supply system is simplified and the length of the fuel supply piping is reduced. Furthermore, such an arrangement of the fuel filling mouth 37, the fuel strainer 41 and the fuel pump 42 further enhances the provision of a large tank having an increased capacity as the fuel tank 35. Still further, the front wall of the helmet container 22 extends along the partition wall member 46 to a position below the partition wall member 46 to shield the fuel pump 42 and the associated components from the engine 15. Thus, the helmet container 22 functions as a heat insulating member which intercepts the heat radiated from the engine 15.

Figure 5:
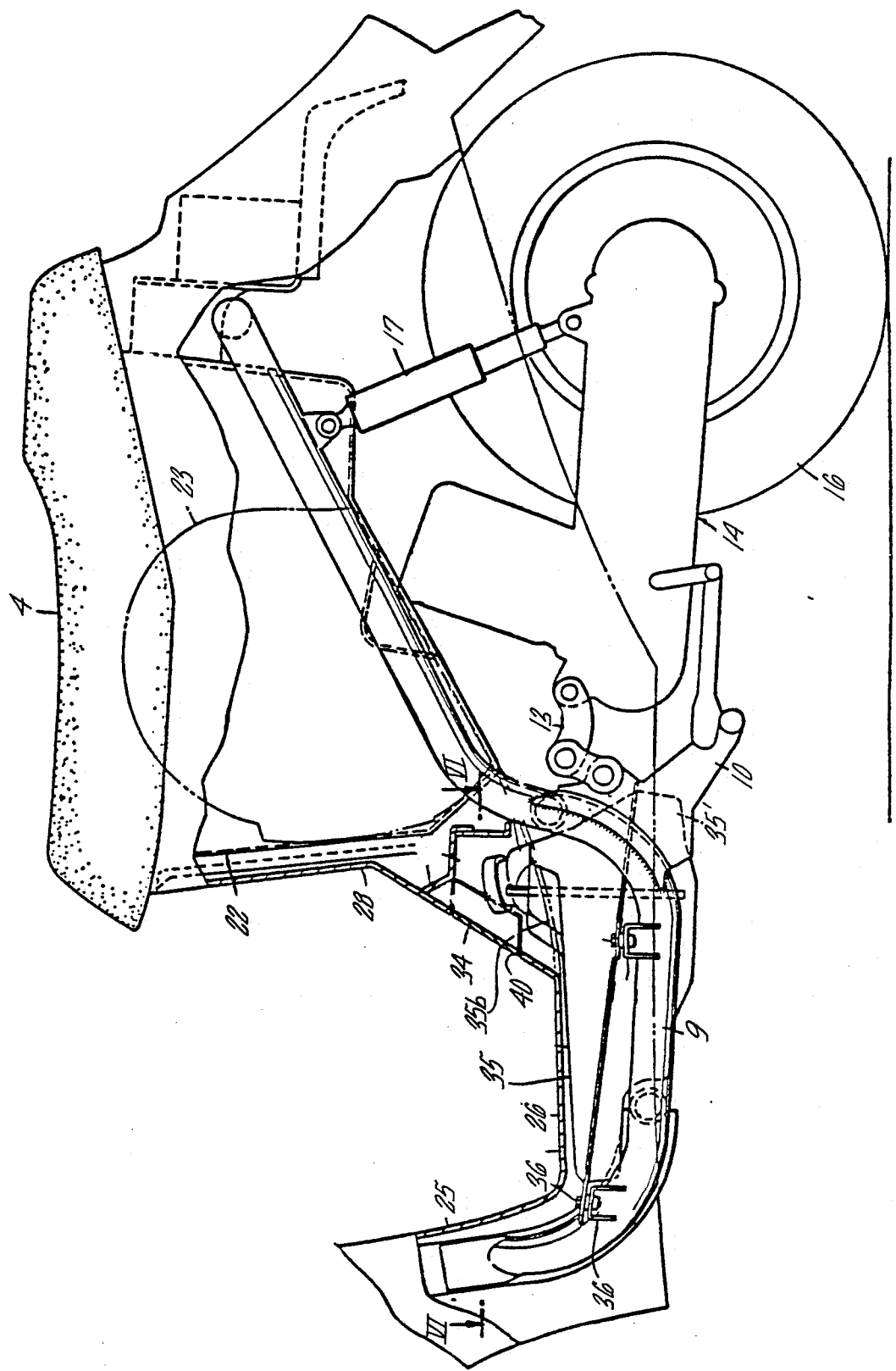
FIG. 5 is a partial sectional side elevation of a motor scooter according to a second embodiment of the invention.
Figure 6:
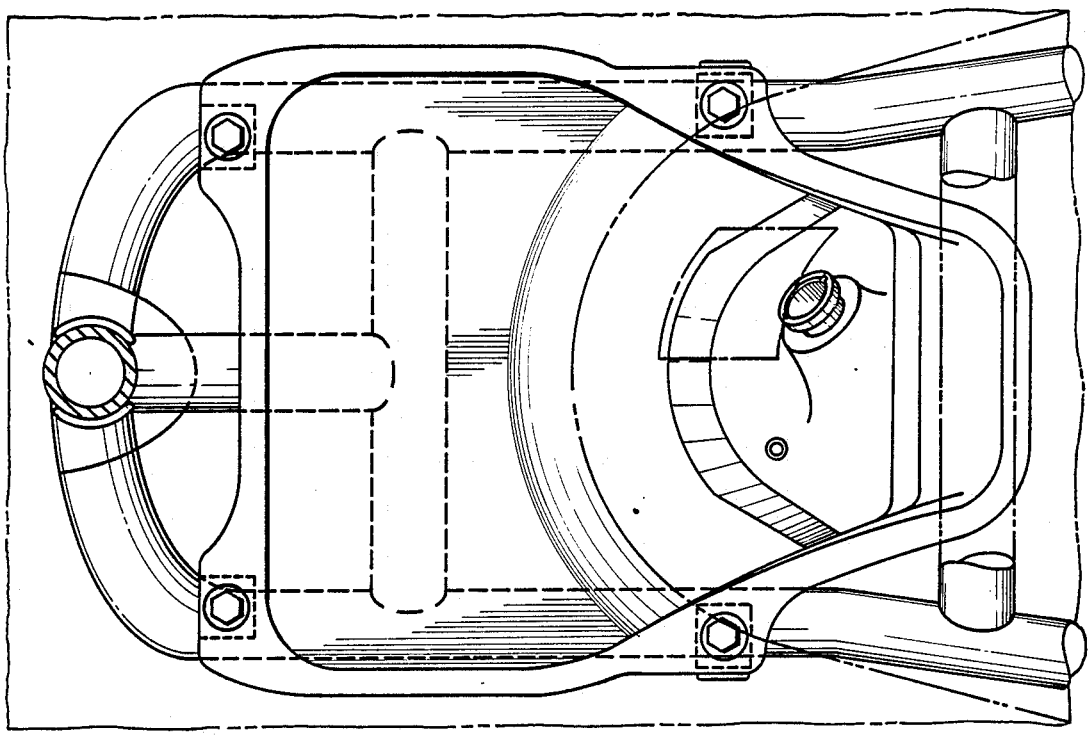
FIG. 6 is a sectional view taken along line VI—VI of FIG. 5.

In the embodiment of FIG. 5, the junction of the frame 6 and the linkage 13 for supporting the front end of the power unit 14 in the second embodiment is higher than that in the first embodiment, and the fuel tank 35 in the second embodiment has a rear extension 35'. The fuel tank 35 is disposed with the rear extension 35' received in a dead space under the linkage 13. Thus, the fuel tank 35 in the second embodiment has a capacity greater than that of the fuel tank 35 in the first embodiment. As shown in FIG. 5, the upper wall of the fuel tank 35 is downwardly inclined in a state where the main stand 20 is retracted, and, hence, it is possible to make the fuel spilt in filling fuel in the fuel tank 35 with the rider seated on the seat to flow toward the front. Thus, the second embodiment exerts essentially the same functions and effects as those of the first embodiment.

Figure 11:
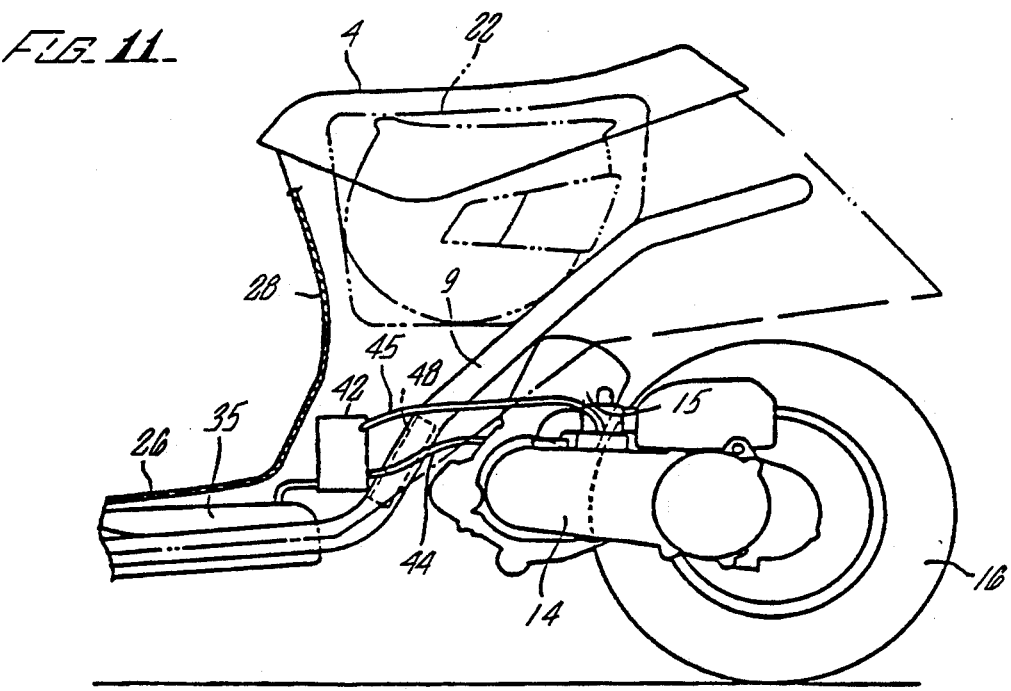
FIGS. 11 and 12 are views illustrating third and fourth embodiments of the invention.

FIG. 11 shows a fuel supply system according to a third embodiment of the present device. In this embodiment, the helmet container 22 is disposed in the upper section of the rear portion of the chassis, and hence the helmet container 22 does not function as a heat insulating member. Accordingly, a cross plate 48 is extended in front of the engine 15 between the right and left frame pipes 9 of the chassis to intercept the heat radiated from the engine 15. The cross plate 48 serves also as a frame reinforcing member.

Figure 12:
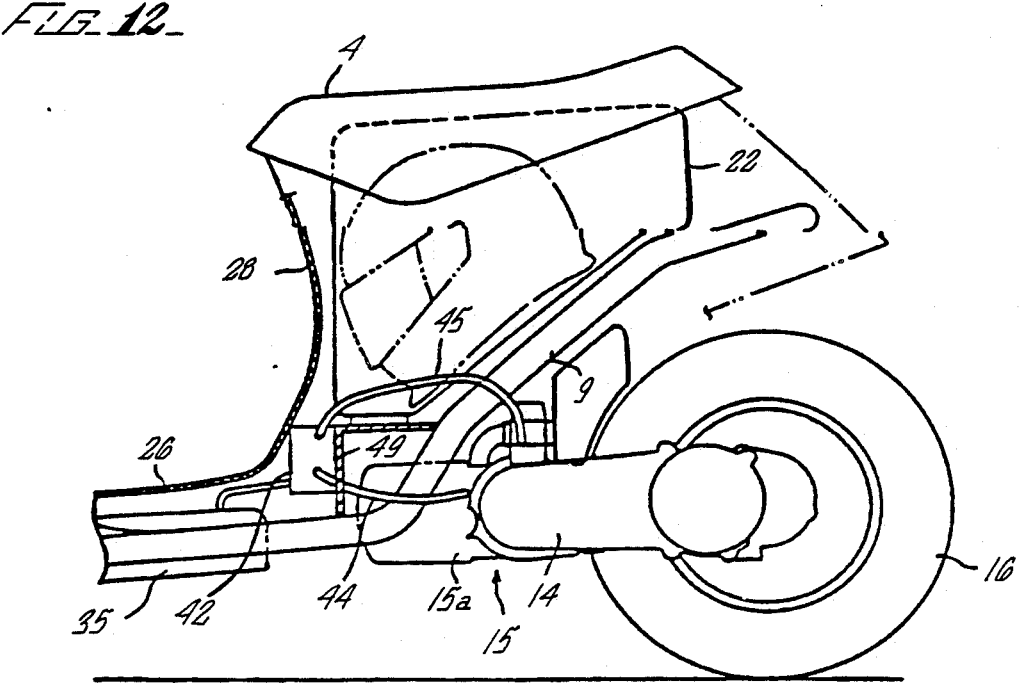

FIG. 12 shows a fuel supply system according to a third embodiment of the present invention. A motor scooter incorporating the fuel supply system in the third embodiment is equipped with a horizontal engine 15 having a horizontal cylinder 15a extending to the front. A cross plate 49 having an L-shaped cross section is extended between the right and left frame pipes 9 so as to cover the front surface and upper surface of the cylinder 15a. The cross plate 49 serves as a heat insulating member for insulating the fuel pump 42 from heat, and as a member for supporting a helmet box 22.

FIGS. 13 to 17 illustrate a motor scooter employing a fuel supply system according to yet another embodiment of the invention wherein like components are identified by numeral designations corresponding to those employed in the other figures. According to this motor scooter organization the fuel tank 35 is located beneath the foot rest floor 26 as in the previously described embodiments. The fuel filling mouth 37 of the earlier embodiments is replaced by an elongated fuel filler pipe 60 that communicates with the front portion of the fuel tank 5. The pipe 60, which may be formed of a flexible material, extends vertically along the head pipe 7 within the front portion of the body cover 25. A fuel inlet 61 covered by a closure cap 2 is disposed at the distal end of the pipe 60. Access to the fuel filler inlet 61 is obtained by means of an opening 63 formed in the body cover 25, which opening is closed by a hinged lid 64.

In this motor scooter organization the case body 66 of an air cleaner 65 is disposed in the dead space behind the lower portion of the center cover member 28, which is provided with an opening 67 closed by a hinged closure cover 68 for accessing the air cleaner. As shown, the air cleaner case body 66 has a lid 9 for holding an air cleaner element 70 having suction ports 71 provided therein. The outlet port 72 of the air cleaner 65 is connected to the carburetor C via an air chamber 73 by the air conduit pipe 74.

The motor scooter of this embodiment contains a luggage container 22' for housing a pair of helmets indicated as H1 and Hz The luggage container 22' is formed by substantially rectangularly disposed side walls and is elongated in the front-to-back longitudinal direction The top of the container 22' is open for accessing the interior thereof. The top opening is closed by the seat 4 which is attached to the container for pivotal movement and which may be locked in the closed position by a locking mechanism 75.

The luggage container 22' is attached to cross members 76 and 77 between the frame pipes 9l and 9r by means of bolts 78. At about the longitudinal midpoint of the container the bottom wall is recessed as at 79 to form a channel-like cross section protruding into the container interior across the bottom wall 80. This protrusion conveniently accommodates the cross member 77 and also assists in positioning the helmets H1 and Hz within the compartment. By means of the arrangement the shock absorber 17 has ample freedom of movement for expansion and contraction caused by the up-and-down pivotal movement of the power unit 14.

The side walls of the container 22' are covered by the cover 28. An auxiliary lid 81, pivoted by a hinge 82, is provided on the upper portion of the container beneath the rear end of the seat 4. The lid 81 closes the rear end of the compartment 22', as well as a compartment formed by cover 28 for housing a tank 83 for lubricating oil. Alternatively, instead of the auxiliary lid 81, the seat 4 can be extended rearwardly as shown by the phantom line 4'.

The forward end 84 of the rear fender is integrally formed on the rear side of the compartment 22'. The rear end 86 of the fender is attached to the forward end by bolts 85. A tail light mounting 87 is provided on the rear end 84 of the fender.

As is apparent from the foregoing description of the present invention, there is provided a fuel tank assembly for a motor scooter having a large luggage container adjacent to the fuel tank whereby the front lower portion of the container is adjacent to the rear of the fuel tank so that both the fuel tank and the luggage container can be provided with increased capacity and the center of gravity of the motor scooter can be lowered. An accommodating space for the functional parts of the fuel tank assembly or of the engine can be disposed above the fuel tank and below the front lower portion of the luggage container behind the center cover of the seat mount. A fuel tank which is essentially horizontally flat is disposed under the foot rest floor with the fuel filling mouth thereof projecting either into a space behind the center cover or to an elevated position in the forward portion of the front cover. A fuel strainer and a fuel pump can be disposed beside the fuel filling mouth within the space. Alternatively, the space can be occupied by an air cleaner, or the like. Accordingly, the foot rest floor can be formed in a wide, flat surface, the fuel supply system can be simplified, the length of the fuel piping can be reduced, and a large fuel tank having a large capacity can be protectively disposed between spaced frame members under the foot rest floor.

Furthermore, according to the present device, since a heat insulating member is provided between the fuel pump and the engine, the fuel pump can be disposed sufficiently near the engine without entailing adverse influence of the heat radiated by the engine on the fuel pump, and thereby the piping connecting the fuel pump to the engine can be simplified and the length of the piping can be reduced.

Still further, since the upper wall of the fuel tank is inclined downwardly toward the front and is in close proximity to the foot rest floor, the center of gravity of the motor scooter is lowered, and the disturbance of the fuel due to the vertical vibrations and acceleration of the motor scooter is suppressed to improve the running performance of the motor scooter.

Moreover, since the fuel filling mouth is provided either in the rear portion of the fuel tank or the forward portion thereof, the foot rest floor can be formed in a flat shape so that the rider is able to put his feet properly on the foot rest floor.

It should be further understood that, although preferred embodiments of the invention have been illustrated and described herein, changes and modifications can be made in the described arrangements without departing from the scope of the appended claims.

We claim:

1. A motor scooter comprising:
a frame mounting longitudinally spaced front and rear wheels;
a body cover covering said frame and having a seat mount thereon;
a foot rest floor positioned forwardly of said seat mount;
a fuel tank assembly including a fuel tank positioned below said foot rest floor;
a luggage compartment positioned below said seat and having a front lower portion disposed adjacent the rear of said fuel tank;
a functional parts accommodating space disposed in a dead space within said seat mount between said luggage compartment front lower portion and said rear of said fuel tank; and
a fuel filler mouth penetrating the rear portion of said fuel tank toward one lateral side of said fuel tank top surface and a fuel pump positioned over the other lateral side of said fuel tank top surface within said functional parts accommodating space.

2. A motor scooter comprising:
a frame mounting longitudinally spaced front and rear wheels and having oppositely spaced frame pipes;
a body cover covering said frame and including a seat mount thereon having a dead space therein;
a foot rest floor positioned forwardly of said seat mount and supported by said frame pipes;
a fuel tank assembly including a fuel tank positioned between said frame pipes and below said foot rest floor, said fuel tank having a limited vertical height and an expansive flat top surface disposed in closely spaced relation to said foot rest floor throughout the extent of said top surfaces;
a fuel filler mount disposed in said seat mount dead space and penetrating the rear portion of said tank adjacent one lateral side of said top surface;
a fuel pump positioned over the other lateral side of said fuel tank top surface; and
an opening having a detachable cover in said seat mount for accessing said fuel filler mouth.

3. The motor scooter according to either one of claims 1 or 2 in which said fuel tank is inclined downwardly toward said front wheel.

4. The motor scooter according to claim 1 including a power unit pivotally attached at one end to said frame and having said rear wheel rotatably mounted on the free end thereof, said power unit mounting an engine and means forming a heat shield power unit mounting an engine and means forming a heat shield positioned between said engine and said fuel pump.

5. The motor scooter according to claim 4 in which said heat shield is comprised by said luggage compartment front lower portion thereof disposed intermediate said engine and said fuel pump.

6. The motor scooter according to claim 4 in which said heat shield comprises a heat insulating partition extending between said frame pipes intermediate said engine and said fuel pump.

7. The motor scooter according to either one of claims 1 or 2 including an air cleaner disposed in a dead space within said seat mount.

8. The motor scooter according to claim 4 including a suspension means suspendedly supporting said power unit and in which the bottom of said luggage contains a recess disposed in overlying relation to said suspension means.

9. The motor scooter according to claim 8 in which said recess in said container bottom projects interiorly of said container forming a partition dividing said container into two longitudinally spaced sections.

10. The motor scooter according to in which said luggage compartment includes helmet container for housing a pair of longitudinally spaced helmets, said luggage compartment having a top opening closed by a seat.

11. The motor scooter according to claim 10 in which the bottom of said helmet container has a recess forming a partition separating said container into two longitudinally spaced sections for receiving each of said helmets.

12. The motor scooter according to claim 2 including a power unit pivotally attached at one end to said frame and having said rear wheel rotatably mounted on the free end thereof, said power unit mounting an engine and means forming a heat shield positioned between said engine and said fuel pump.

13. The motor scooter according to claim 12 in which said heat shield comprises a luggage compartment carried by said seat mount, said luggage compartment having the lower portion thereof disposed intermediate said engine and said fuel pump.

* * * * *

UNITED STATES PATENT AND TRADEMARK OFFICE
CERTIFICATE OF CORRECTION

PATENT NO. : 4,964,483
DATED : Oct. 23, 1990
INVENTOR(S) : Yokoyama et al.

It is certified that error appears in the above-identified patent and that said Letters Patent is hereby corrected as shown below:

In claim 2 (Col. 8, line 8, delete "surfaces" and insert therefor -- surface --.

In claim 4 (Col. 8, line 23), delete "power unit mounting".

In claim 4 (Col. 8, line 24), delete "an engine and means forming a heat shield".

In claim 10 (Col. 8, line 46) after "to" insert -- claim 1 --.

Signed and Sealed this

Twenty-ninth Day of September, 1992

Attest:

DOUGLAS B. COMER

*Attesting Officer*  *Acting Commissioner of Patents and Trademarks*